(12) United States Patent
Guest

(10) Patent No.: US 6,193,333 B1
(45) Date of Patent: Feb. 27, 2001

(54) VEHICLE BRAKE CONTROL

(75) Inventor: Philip John Guest, Warwick (GB)

(73) Assignee: Rover Group Limited, Warwick (GB)

( * ) Notice: Subject to any disclaimer, the term of this patent is extended or adjusted under 35 U.S.C. 154(b) by 0 days.

(21) Appl. No.: 09/339,671

(22) Filed: Jun. 24, 1999

(30) Foreign Application Priority Data

Jul. 2, 1998 (GB) .................................................. 9814258

(51) Int. Cl.$^7$ ....................................................... B60T 8/32
(52) U.S. Cl. ............................................ 303/192; 180/170
(58) Field of Search ................................ 303/2, 191, 138, 303/192, 199, 121, 125; 180/170; 701/70, 93, 96; 477/71, 73, 75

(56) References Cited

U.S. PATENT DOCUMENTS 5,003,483 * 3/1991 Hedstrom ......................... 180/179 X
5,452,946 * 9/1995 Warner ................................. 303/24.1
5,941,614 * 8/1999 Gallery et al. ......................... 303/192
5,997,108 * 12/1999 Claussen et al. ..................... 303/192

FOREIGN PATENT DOCUMENTS

96/11826   4/1996   (WO) .

* cited by examiner

*Primary Examiner*—Matthew C. Graham
*Assistant Examiner*—Pamela J. Rodriguez
(74) *Attorney, Agent, or Firm*—Davis and Bujold

(57) ABSTRACT

An automatic brake control system for a vehicle in which the brakes 16, 17 are controlled by a control unit 22 to limit vehicle speed when descending a hill is provided with an input from a sensor on the gear selector 28. The control unit has a vehicle speed characteristic associated with each gear, the characteristics relating vehicle speed as controlled by the brake system to the position of the accelerator pedal, and having a different minimum speed for each gear.

10 Claims, 2 Drawing Sheets

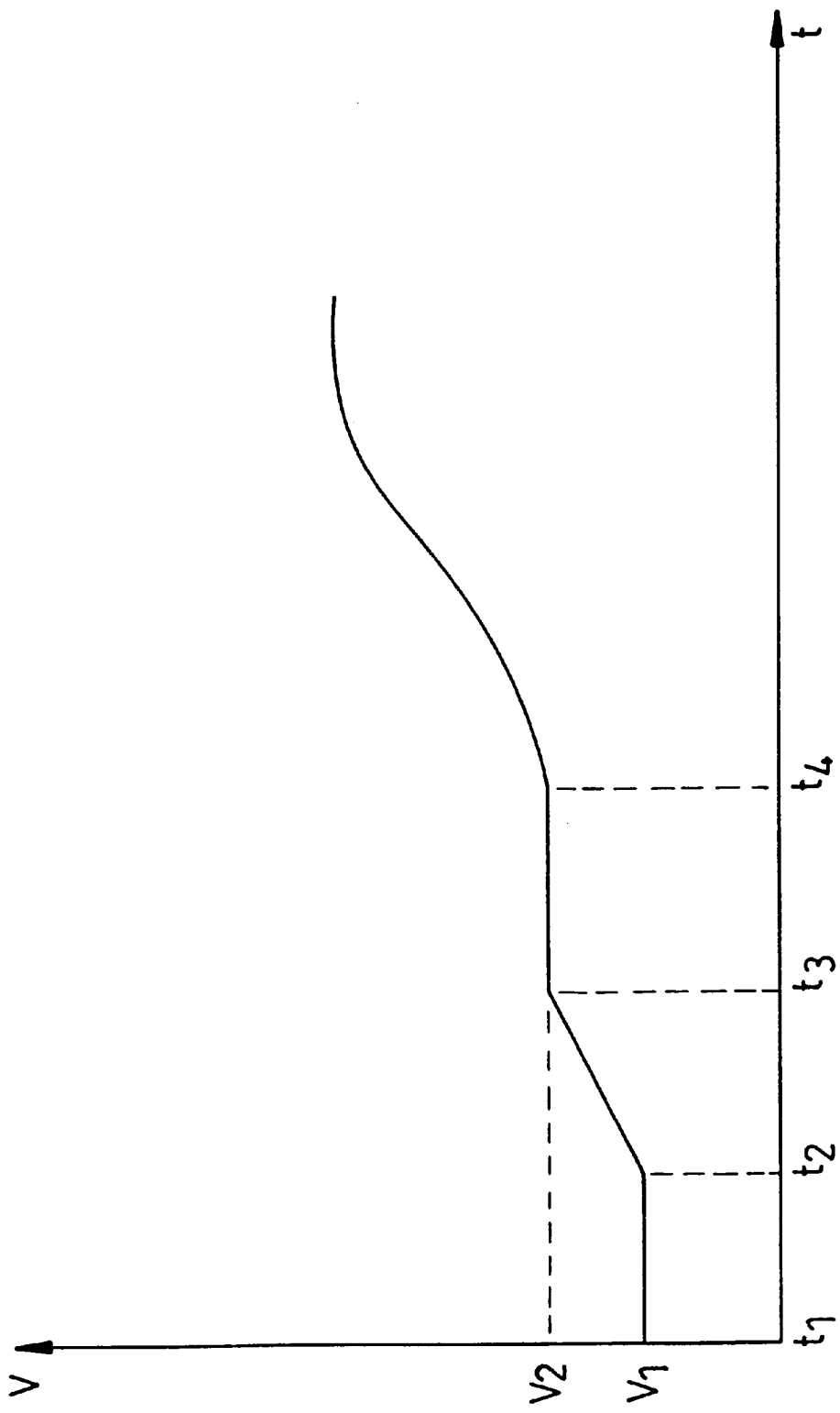

VEHICLE BRAKE CONTROL

BACKGROUND TO THE INVENTION

The invention relates to control of a vehicle braking system, and in particular to the use of the braking system to control the descent of hills by the vehicle. It is particularly useful for off-road vehicles.

It is known from WO 96/11826 to provide a brake control system for a vehicle in which the brakes are automatically controlled so as to limit the vehicle speed to a predetermined value such that, with the help of an anti-lock brake function, the descent of a steep hill can be controlled without the need for skilled inputs from the driver.

SUMMARY OF THE INVENTION

The present invention provides a braking system for a vehicle having a transmission which can be shifted between a plurality of transmission ratios, the system comprising braking means, control means for controlling application of the braking means, and ratio detection means for detecting which ratio the transmission is operating in, wherein the control means is arranged to control the braking means so as to limit the speed of the vehicle to a target speed, the magnitude of which is dependent on which transmission ratio is selected.

This arrangement allows increased control for the driver and helps the vehicle to behave in a manner under control of the system which more closely resembles normal driving on flat ground.

If the vehicle includes a manual gear lever the ratio detection means may comprise a simple microswitch, or similar sensor, on the gear lever. Alternatively, it may form part of a control system on the vehicle, such as the engine management system or the anti-lock braking system or a combination of the two, which can determine the gear selected from the engine speed and vehicle road or wheel speed. This is obviously more likely to be used in vehicles without a traditional gear lever, for example those with upshift and downshift buttons on the steering wheel, or those with automatic transmissions. As a further alternative if the vehicle includes an electronic transmission controller which controls the transmission ratio, for example as in more sophisticated continuously variable transmissions, that controller can act as the ratio detection means.

Preferably the transmission ratios are spread over a range from a highest ratio to a lowest ratio and the target speed is higher for a higher one of said ratios than for a lower one. In this specification a higher gear ratio means one in which the transmission produces a higher vehicle speed for a given engine speed.

Preferably the control means is arranged, if the transmission ratio is changed while the system is activated, to change the target speed thereby to change the speed at which the vehicle will travel.

Preferably the control unit is arranged to change the target speed at a controlled rate thereby to limit the acceleration or deceleration rate of the vehicle as it changes between the target speeds.

Preferably, in at least one of said transmission ratios, the target speed can be increased by operation of an accelerator of the vehicle.

Preferably, for each of said transmission ratios, the control means defines a characteristic relating accelerator position to target speed so that, in each of said ratios, the speed of the vehicle can be controlled by operation of the accelerator.

An embodiment of the invention will now be described by way of example and with reference to the accompanying drawings.

BRIEF DESCRIPTION OF THE DRAWINGS

FIG. 2 is a graph showing variations in vehicle speed with time under the control of the brake control system.

DESCRIPTION OF THE PREFERRED EMBODIMENTS

Figure 1:
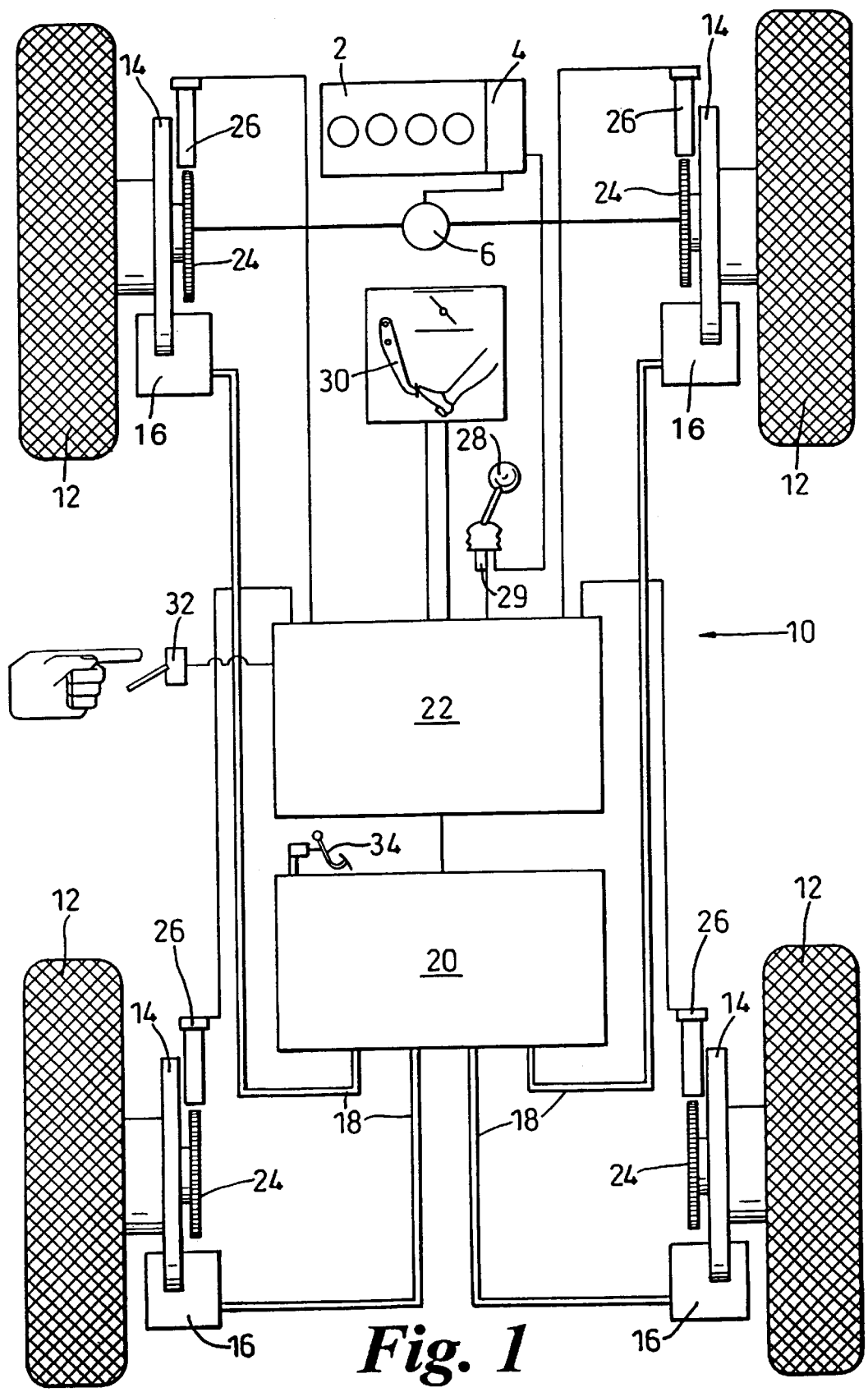
FIG. 1 is a schematic diagram of the vehicle of the embodiment.

As shown in FIG. 1, the vehicle 10 includes an engine 2 and a manual five speed transmission 4 for providing driving torque from the engine 2 via a differential 6 to two of the four vehicle wheels 12. Each wheel 12 is provided with a co-rotating brake disc 14 which is acted upon by a brake calliper 16. The brake callipers 16 are hydraulically operated and a hydraulic line 18 leads from each brake calliper to a hydraulic brake control system 20 which includes a hydraulic pump and valves so that it can increase and decrease the braking pressure independently of the position of the brake pedal. The hydraulic brake control system 20 is controlled by an electronic control unit 22.

Each wheel 12 also carries a co-rotating toothed wheel 24. An inductive sensor 26 is provided adjacent each toothed wheel 24 and provides a signal to the electronic control unit 22 in the form of a regular wave form voltage, the frequency of which is indicative of the wheel speed.

A gear lever 28 is also provided to enable the driver to select which gear ratio the vehicle transmission 4 is to operate in, and a sensor 29 is associated with the gear lever 28 and connected to the electronic control unit 22 to send a signal to the electronic control unit 22 indicating which gear is selected.

The accelerator pedal 30 has a continuously variable sensor in the form of a potentiometer associated with it which provides an analogue signal to the electronic control unit 22 which is dependent upon the position, or angle, of the accelerator pedal.

A manually operable switch 32 is also connected to the electronic control unit 22.

In use, the vehicle is driven normally when the switch 32 is switched off. Under these conditions the electronic control unit 22 operates the anti-lock braking function to prevent locking of the wheels if the driver brakes using the brake pedal 34. Also traction control is provided by the control unit 22. Both of these functions are carried out in known manner by monitoring the speed and acceleration of each wheel and a detected vehicle speed calculated from the speeds of all the wheels. The detected vehicle speed is calculated by using an average of all the wheel speeds, but ignoring the speeds of any wheels which are detected as locked or spinning. Locked wheels will be released by releasing braking pressure using the anti-lock valves in the hydraulic control unit 20, and spinning wheels will be slowed by applying a braking pressure from the pump.

When the activation switch 32 is switched on by the driver to select hill descent mode, the electronic control unit takes active control of the vehicle's speed, controlling the application and release of the brakes to limit the vehicle's speed as described below.

With reference to FIG. 2, the electronic control unit 22 has stored in memory a fixed minimum target speed associated with each gear of the vehicle transmission, the speeds increasing for higher gears from about 7 kph for first gear up to about 14 kph for 5th gear. There is also a minimum reverse target speed of about 6 kph associated with reverse gear. Basically, provided the driver is not operating the brake or accelerator pedal, the control system controls the brakes to limit the vehicle to the minimum target speed associated with the selected gear ratio so that, when the vehicle is descending a hill, it will not accelerate to an unsafe speed.

The control unit is also arranged to operate the brakes to control the acceleration and deceleration rate of the vehicle to keep it to safe limits, both when the system is first activated, and when it is changing the speed of the vehicle as a result of a change of gear by the driver.

Finally, as well as the fixed minimum target speed, the electronic control unit 22 has a target speed characteristic associated with each gear relating target speed to accelerator pedal position, so that, by depressing the accelerator pedal the driver can increase the speed of the vehicle under the control of the system, provided that the vehicle is on a hill steep enough to produce the acceleration requested by the driver. For any given position of the accelerator pedal 30, the target speed will be higher for higher gears.

Considering the sequence shown in FIG. 2 as an example, at time $t_1$ the system is active and the vehicle is in first gear and on a downward hill, and the driver has released both the brake and accelerator pedals. The system therefore applies the brakes to limit the vehicle to the minimum target speed $v_1$ associated with first gear, subject to the operation of the anti-lock braking function. At time $t_2$ the driver selects second gear, and the control unit releases the brakes slightly so as to allow the vehicle to accelerate, at up to a maximum acceleration rate, up to a minimum target speed $v_2$ associated with second gear, which speed is reached at time $t_3$. Then at time $t_4$ the driver depresses the accelerator, and thereafter, provided the slope is steep enough to provide the acceleration requested by the driver, the speed of the vehicle is controlled by the brake control system to follow the demand of the driver, subject to the maximum acceleration and deceleration limits.

It will be appreciated that the system described enables the driver to use the gear select lever as well as the accelerator pedal as a means for controlling the vehicle speed while the brake control system is still active. In any one gear the speed can be varied by operation of the accelerator, and for any position of the accelerator the speed can be varied by changing the gear selected. This makes controlling the vehicle with the help of the system more similar to controlling it under normal driving conditions.

What is claimed is:

1. A braking system for a vehicle having a transmission which can be shifted between a plurality of transmission ratios including a higher ratio and a lower ratio, the system comprising braking means, control means for controlling application of the braking means, and ratio detection means for detecting which ratio the transmission is operating in, wherein the control means defines a target speed and is arranged to control the braking means so as to maintain the speed of the vehicle at the target speed, the magnitude of the target speed is dependent on which transmission ratio is selected, and the target speed is higher when the higher ratio is selected than when the lower ratio is selected.

2. A system according to claim 1 wherein the control means is arranged, if the transmission is shifted between two of said ratios while the system is activated, to change the target speed thereby to change the speed at which the vehicle will travel.

3. A system according to claim 2 wherein the control means is arranged to change the target speed at a controlled rate thereby to limit at least one of the acceleration and deceleration rates of the vehicle as the target speed changes.

4. A system according to claim 1 for a vehicle which further comprises an accelerator wherein, in at least one of said transmission ratios, the target speed can be increased by operation of the accelerator.

5. A system according to claim 4 wherein, for each of said transmission ratios, the control means defines a characteristic relating the position of the accelerator to the target speed so that, in each of said ratios, the speed of the vehicle can be controlled by operation of the accelerator.

6. A braking system for a vehicle having wheels and a transmission which can be shifted between a plurality of transmission ratios including a higher ratio and a lower ratio, the system comprising brakes for braking the wheels, a controller for controlling application of the brakes, and a ratio detector for detecting at which ratio the transmission is operating, wherein the controller defines a target speed and a magnitude of the target speed is dependent on which transmission ratio is selected, the controller is arranged to control the brakes so as to maintain the speed of the vehicle at the target speed, and the target speed is higher when the higher ratio is selected than when the lower ratio is selected.

7. A system according to claim 6 wherein the controller is arranged, if the transmission is shifted between two of said ratios while the system is activated, to change the target speed thereby to change the speed at which the vehicle will travel.

8. A system according to claim 7 wherein the controller is arranged to change the target speed at a controlled rate thereby to limit at least one of an acceleration rate and a deceleration rate of the vehicle as the target speed changes.

9. A system according to claim 6 for a vehicle which further comprises an accelerator wherein, in at least one of said transmission ratios, the target speed can be increased by operation of the accelerator.

10. A system according to claim 9 wherein, for each of said transmission ratios, the controller defines a characteristic relating a position of the accelerator to the target speed so that, in each of said ratios, the speed of the vehicle can be controlled by operation of the accelerator.

* * * * *